(12) United States Patent
Jia et al.

(10) Patent No.: US 9,804,441 B2
(45) Date of Patent: Oct. 31, 2017

(54) ELECTRONIC DEVICE OPTICAL SENSING SYSTEM WITH STRAY LIGHT SUPPRESSION

(71) Applicant: Apple Inc., Cupertino, CA (US)

(72) Inventors: Zhang Jia, Santa Clara, CA (US); James J. Dudley, Sunnyvale, CA (US); Katherine J. Spriggs, Palo Alto, CA (US); William A. Tashman, Atherton, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 15/055,377

(22) Filed: Feb. 26, 2016

(65) Prior Publication Data
US 2017/0176787 A1  Jun. 22, 2017

Related U.S. Application Data

(60) Provisional application No. 62/271,099, filed on Dec. 22, 2015.

(51) Int. Cl.
| | |
|---|---|
| *G02F 1/1333* | (2006.01) |
| *G02F 1/1335* | (2006.01) |
| *G02B 5/00* | (2006.01) |
| *G02F 1/1368* | (2006.01) |

(52) U.S. Cl.
CPC .......... *G02F 1/1336* (2013.01); *G02B 5/003* (2013.01); *G02F 1/1368* (2013.01); *G02F 1/133502* (2013.01); *G02F 1/133512* (2013.01); *G02F 1/133514* (2013.01); *G02F 2001/133601* (2013.01)

(58) Field of Classification Search
CPC ............. G01J 1/10; G01J 1/4204; G09G 5/10
USPC ......................................................... 349/110
See application file for complete search history.

(56) References Cited

U.S. PATENT DOCUMENTS

| 7,633,586 B2 | 12/2009 | Wonlow et al. | |
|---|---|---|---|
| 9,116,043 B2 | 8/2015 | Zheng | |
| 9,477,263 B2 * | 10/2016 | Hotelling | G06F 1/1626 |
| 2010/0308345 A1 | 12/2010 | Brown et al. | |
| 2014/0061431 A1 * | 3/2014 | Fukagawa | G01J 1/42 250/206 |
| 2014/0219646 A1 | 8/2014 | Hooton et al. | |
| 2015/0187258 A1 * | 7/2015 | Lee | G06K 9/00604 345/207 |

(Continued)

*Primary Examiner* — Hoan C Nguyen
(74) *Attorney, Agent, or Firm* — Treyz Law Group, P.C.; G. Victor Treyz

(57) ABSTRACT

An electronic device display may have an active area with an array of pixels and an inactive area. A light-transmitting window may be formed in the inactive area. A light-sensing component such as an ambient light sensor may be mounted within the housing in alignment with the window. Opaque masking material may be provided on one or more layers of the display in the inactive area and may have an opening for the window. Backlight structures in the display may generate backlight illumination for pixels in the active area. Stray portions of the backlight illumination may be blocked using a stray light absorption layer on one of the layers of the display such as a layer other than the layer on which the opaque masking material is formed. The stray light absorption layer may have an opening aligned with the window.

23 Claims, 6 Drawing Sheets

(56) References Cited

U.S. PATENT DOCUMENTS

2015/0253487 A1 9/2015 Nichol et al.
2016/0054175 A1 2/2016 Jia et al.

* cited by examiner

ELECTRONIC DEVICE OPTICAL SENSING SYSTEM WITH STRAY LIGHT SUPPRESSION

This application claims the benefit of provisional patent application No. 62/271,099, filed Dec. 22, 2015, which is hereby incorporated by reference herein in its entirety.

BACKGROUND

This relates generally to electronic devices and, more particularly, to electronic devices with light-sensing components.

Electronic devices often include light sensors. For example, a portable computer may contain an ambient light sensor. Ambient light measurements may be made with the ambient light sensor to determine whether the portable computer is in a bright or dark environment. Control circuitry within the portable computer can adjust display brightness based on information from the ambient light sensor. For example, if a user moves a portable computer to a bright outdoors environment, display brightness can be increased to compensate for glare.

It can be challenging to form ambient light sensing systems in electronic devices. If care is not taken, stray light from a display backlight can interfere with ambient light measurements. Stray light shielding structures may be difficult to incorporate into an electronic device without becoming unsightly or ineffective at preventing stray light interference.

It would therefore be desirable to be able to provide improved stray light suppression structures for electronic devices with light sensing components.

SUMMARY

An electronic device may have a housing in which a display is mounted. The housing may be, for example, a laptop computer housing having first and second portions that rotate with respect to each other. The display may be mounted in the first of the housing portions. A keyboard and other components may be mounted in the second of the housing portions.

The display may have an active area with an array of pixels and an inactive area that serves as a border for the array of pixels. A light-transmitting window may be formed in the inactive area. A light-sensing component such as an ambient light sensor may be mounted within the housing in alignment with the window. Opaque masking material may be provided on one or more layers of the display in the inactive area to block internal components from view. The opaque masking material may be formed from a layer of opaque material such as black in and may have an opening for the light-transmitting window.

Backlight structures in the display may generate backlight illumination for pixels in the active area such as liquid crystal display pixels. Stray portions of the backlight illumination may be blocked using a stray light absorption layer on one of the layers of the display. A stray light absorption layer may be formed, for example, on a display layer in the inactive area other than the layer on which the opaque masking material is formed. The stray light absorption layer may have an opening for the window that is aligned with the opening in the opaque masking layer. The index of refraction of the stray light absorption layer may match the index of refraction of the display layer on which the stray light absorption layer is formed to help defeat total internal reflection and thereby extract stray light for absorption within the stray light absorption layer.

DETAILED DESCRIPTION

Figure 1:
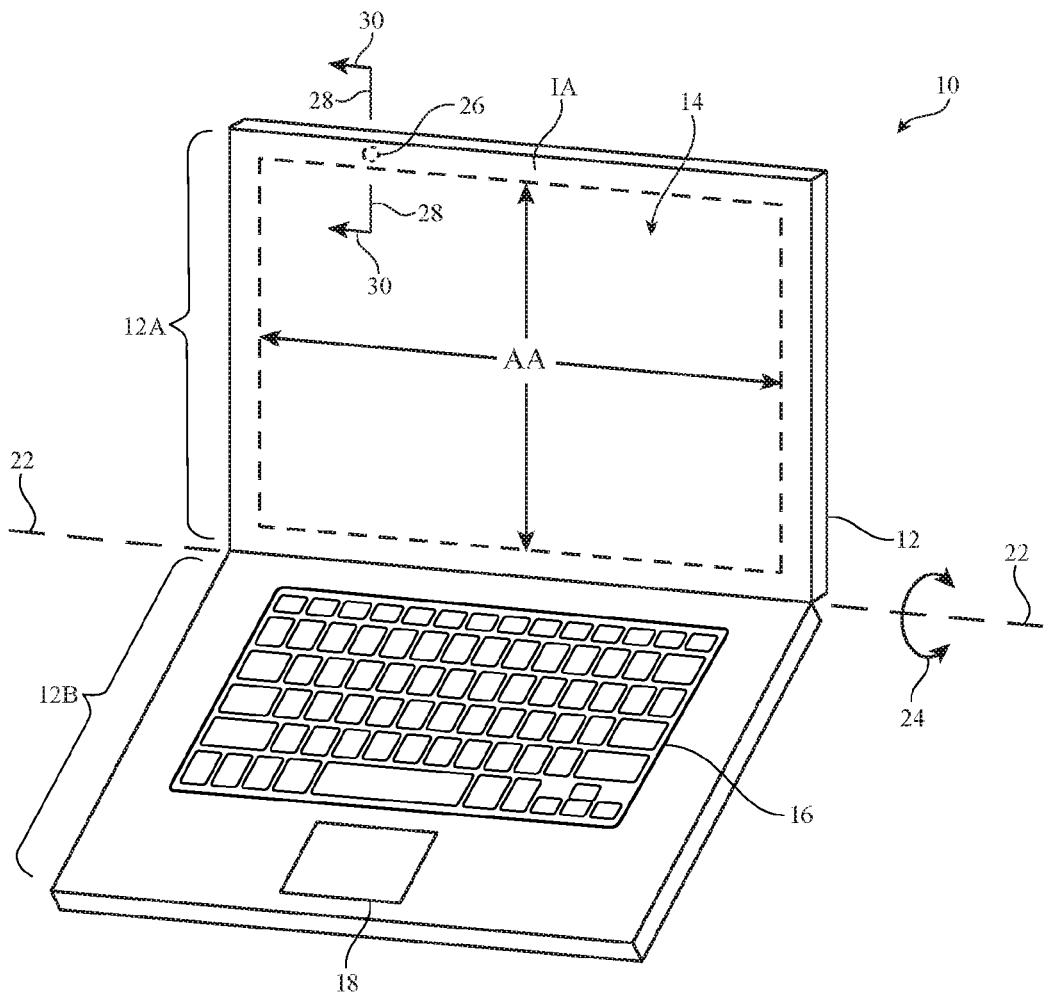
FIG. 1 is a perspective view of an illustrative electronic device of the type that may have a light sensor in accordance with an embodiment.

An electronic device such as electronic device 10 of FIG. 1 may contain one or more light-sensing devices. Device 10 may be a handheld electronic device such as a cellular telephone, media player, gaming device, or other device, may be a wristwatch device or other small portable device, may be a laptop computer, tablet computer, or other portable computer, may be a desktop computer, may be a computer display, may be a display containing an embedded computer, may be a television or set top box, or may be other electronic equipment. Configurations in which device 10 has a rotatable lid such as configurations in which device 10 is a portable computer may sometimes be described herein as an example. This is, however, merely illustrative. Device 10 may be any suitable electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multipart housing constructions may also be used in which housing 12 or parts of housing 12 are formed from frame structures, housing walls, and other components that are attached to each other using fasteners, adhesive, and other attachment mechanisms.

Device 10 may include a display such a display 14. Display 14 may be a liquid crystal display (LCD), a plasma display, an organic light-emitting diode (OLED) display, an electrophoretic display, or a display implemented using other display technologies. A touch sensor may be incorporated into display 14 (i.e., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have a one-piece housing or a multi-piece housing. As shown in FIG. 1, for example, electronic device 10 may be a device such as a portable computer or other device that has a two-part housing formed from an upper housing portion such as upper housing 12A and lower housing portion such as lower housing 12B. Upper housing 12A may include display 14 and may sometimes be referred to as a display housing or lid. Lower housing 12B may sometimes be referred to as a base housing or main housing. Housings 12A and 12B may be connected to each other using hinge structures located along the upper edge of lower housing 12B and the lower edge of upper housing 12A. The hinges may allow upper housing 12A to rotate about axis 22 in directions 24 relative to lower housing 12B. The plane of lid (upper housing) 12A and the plane of lower housing 12B may be separated by an angle that varies between 0° when the lid is closed to 90°, 140°, or more when the lid is fully opened.

As shown in FIG. 1, device 10 may have input-output devices such as track pad 18 and keyboard 16. Track pad 18 and keyboard 16 may be mounted in lower housing 12B. Connector ports in device 10 may receive mating connectors (e.g., an audio plug, a connector associated with a data cable such as a Universal Serial Bus cable, a data cable that handles video and audio data such as a cable that connects device 10 to a computer display, television, or other monitor, etc.). Device 10 may also have components such as cameras, microphones, speakers, buttons, status indicator lights, buzzers, sensors, and other input-output devices. These devices may be used to gather input for device 10 and may be used to supply a user of device 10 with output.

Some of the input-output devices of device 10 may be light-based devices such as light detectors or other light-sensing devices. Light-sensing devices for device 10 may include light-based proximity sensors (e.g., a sensor that emits modulated infrared light and that measures corresponding infrared light reflected from a nearby object to estimate the distance between the object and device 10), may include a camera (e.g., a digital image sensor with an array of light-sensing pixels), and/or may contain ambient light sensors for sensing ambient visible light, ambient infrared light, and/or ambient ultraviolet light.

Ambient light sensors for device 10 may include monochromatic and/or color-sensing ambient light sensors. A monochromatic ambient light sensor for device 10 may be formed from a light detector that measures ambient light levels for the entire visible spectrum, part of the visible light spectrum, and/or other light at other wavelengths (e.g., infrared light) without discriminating between light of different wavelengths. A color-sensing ambient light sensor may contain multiple detectors that are responsive to different respective portions of the light spectrum (i.e., different colors of light). For example, a color-sensing ambient light sensor may have a blue channel sensor to measure blue light intensity in incoming ambient light, a green channel sensor to measure green ambient light intensity, etc.).

Light-sensing devices in device 10 may be mounted in alignment with transparent openings in device 10. The transparent openings, which may sometimes be referred to as windows, may allow light to pass (e.g., so that a light-sensing device in alignment with the window may receive and measure incoming light). Transparent window structures for an ambient light sensor or other light-sensing device may be formed from openings in housing 12, from transparent portions of housing 12, or from other transparent portions of device 10. With one suitable arrangement, which may sometimes be described herein as an example, an ambient light sensor or other light-sensing device may be mounted in alignment with a window that is located in a portion of display 14 such as window 26.

Display 14 may have a central active area AA that contains structures for displaying images (e.g., a rectangular array of pixels to display images) and an inactive border area such as inactive area IA that runs along one or more of the edges of active area AA. As an example, inactive area IA may surround active area AA and may have the shape of a rectangular ring in scenarios in which active area AA has a rectangular shape. Inactive area IA is free of pixels and does not emit light for forming images on display 14.

Window 26 may be formed in inactive area IA (as an example). Opaque masking structures such as a layer of black ink or other opaque material may be provided in area IA of display 14 to block internal components from view from the exterior of device 10. The internal components may include display driver integrated circuits, interconnects, connectors, cables, mounting brackets, component housings, and other structures. An opening may be formed in the opaque masking structures for window 26 (i.e., window 26 may be formed from one or more transparent layers of display 14 without opaque masking structures).

Figure 2:
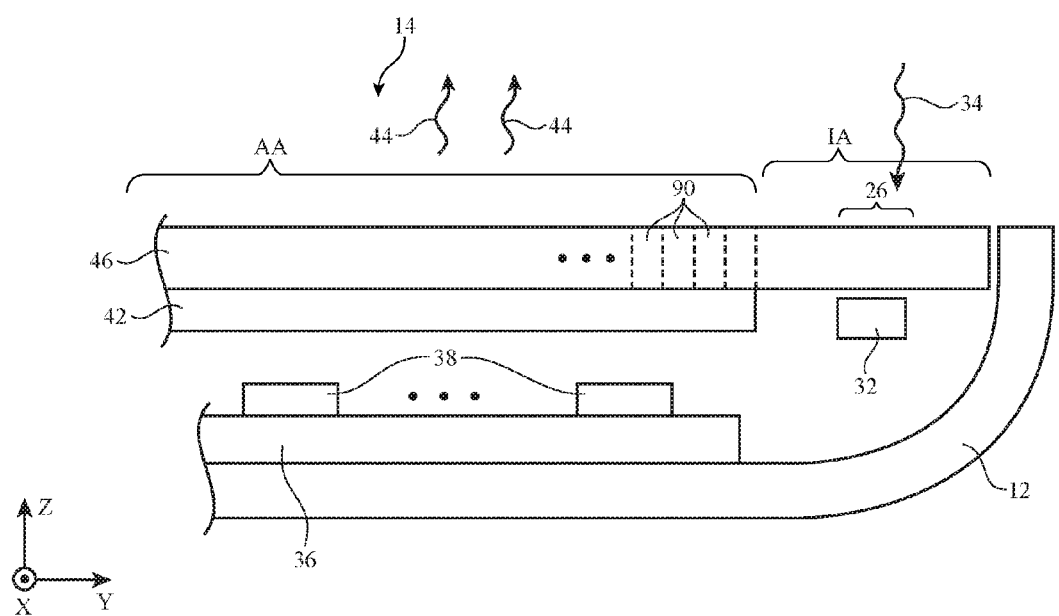
FIG. 2 is a cross-sectional side view of an illustrative electronic device with a light sensor mounted under an inactive portion of a display in accordance with an embodiment.

A cross-sectional side view of a portion of device 10 of FIG. 1 in the vicinity of window 26 taken along line 28 and viewed in direction 30 of FIG. 1 is shown in FIG. 2. As shown in FIG. 2, display 14 may be mounted in housing 12. Electrical components such as components 38 may be mounted on one or more substrates within the interior of device 10 such as substrate 36 (e.g., a printed circuit). Window 26 may be aligned with a light-sensing component in the interior of device 10 such as light-sensing device 32. This allows ambient light 34 to pass through window 26 for measurement by light-sensing device 32. Window 26 may be formed from an opaque masking structure opening within one or more opaque masking layers on one or more respective display layers in inactive area IA.

Display 14 may include substrate layers, backlight structures, and an optional display cover layer formed from a transparent protective material such as clear glass, transparent plastic, sapphire, ceramic, etc. In the illustrative configuration of FIG. 2, display 14 is a backlit display having a backlight unit such as backlight unit 42 that emits backlight illumination 44 in the outwards (Z dimension) direction through display layers 46 in active area AA of display 14. Display layers 46 have structures that form an array of pixels in active area AA and have pixel-free portions that extend into inactive area IA.

Display 14 for device 10 includes pixels 90 formed from liquid crystal display (LCD) components, organic light-emitting diodes, or other suitable pixel structures. A display cover layer may cover the surface of display 14 or a display layer such as a color filter layer, thin-film transistor layer, or other portion of a display may be used as the outermost (or nearly outermost) layer in display 14. The outermost display layer may be formed from a transparent glass sheet, a clear plastic layer, or other transparent member. Configurations for display 14 based on liquid crystal pixels in which the outermost portion of display 14 is formed from a color filter layer, thin-film transistor layer, or other layer that lies adjacent to a liquid crystal layer may sometimes be described herein as an example.

Figure 3:
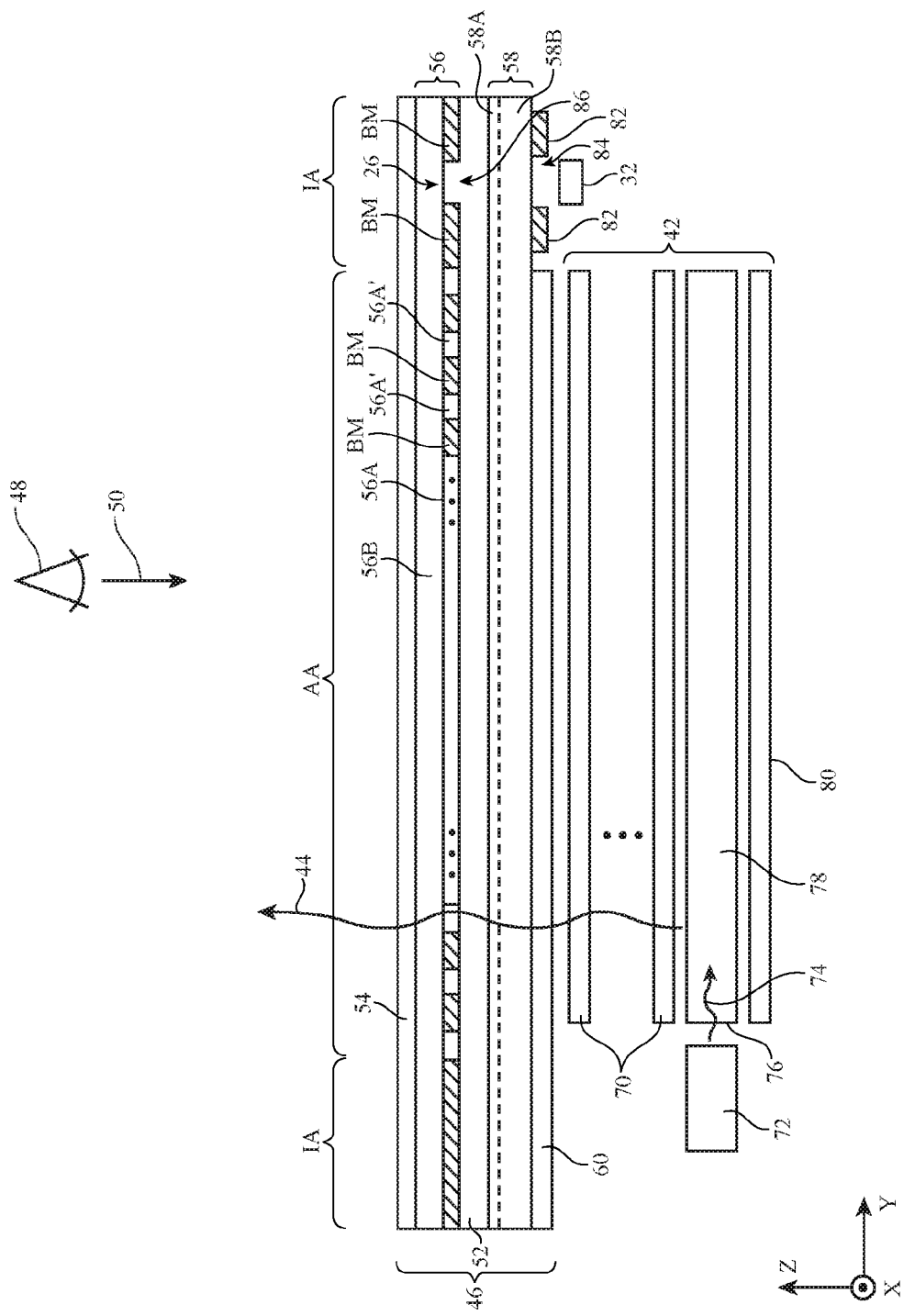
FIG. 3 is a cross-sectional side view of an illustrative display with a backlight and an inactive area having a window for a light sensing device in accordance with an embodiment.

A cross-sectional side view of an illustrative configuration for display 14 of device 10 is shown in FIG. 3. As shown in FIG. 3, display 14 may include backlight structures such as backlight unit 42 for producing backlight illumination 44. During operation, backlight 44 travels outwards (vertically upwards in dimension Z in the orientation of FIG. 3) and passes through pixel structures in active area AA of display layers 46. This illuminates any images that are being produced by the pixels in active area AA of display 14 for viewing by a user. For example, backlight 44 may illuminate images on display layers 46 that are being viewed by viewer 48 in direction 50.

Backlight structures 42 may include a light guide layer such as light guide layer 78. Light guide layer 78 may be formed from a transparent material such as a planar member of clear glass or plastic, may be formed from a thin flexible polymer film, or may be formed from other suitable light transparent structures. During operation of backlight structures 42, a light source such as light source 72 may generate light 74. Light source 72 may be, for example, an array of light-emitting diodes.

Light 74 from light source 72 may be coupled into edge surface 76 of light guide layer 78 and may be distributed in dimensions X and Y throughout light guide layer 78 due to the principal of total internal reflection. Light guide layer 78 may include light-scattering features such as pits or bumps. The light-scattering features may be located on an upper surface and/or on an opposing lower surface of light guide layer 78. Light source 72 may be located at the left of light guide layer 78 as shown in FIG. 3 or may be located along the right edge of layer 78 and/or other edges of layer 78.

Light 74 that scatters outwardly (i.e., upwards in direction Z) from light guide layer 78 may serve as backlight 44 for display 14. Light 74 that scatters inwardly (i.e., downwards) may be reflected back in the upwards direction by reflector 80. Reflector 80 may be formed from a stack of alternating high-index-of-refraction and low-index-of-refraction dielectric layers or other reflective structures. Reflector 80 may be a layer of material that is separate from layer 78 or may be formed as a coating on layer 78.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, turning films for collimating backlight 44, and other films. Optical films 70 may overlap the other structures in backlight unit 42 such as light guide layer 78 and reflector 80. For example, if light guide layer 78 has a rectangular footprint in the X-Y plane of FIG. 3, optical films 70 and reflector 80 may have a matching rectangular footprint.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates. In some configurations, color filter structures and thin-film circuitry for pixels 90 may be formed on a common substrate (e.g., layer 56 or layer 58).

With one illustrative configuration, layer 58 may be a thin-film transistor layer that includes an array of pixel circuits based on thin-film transistors and associated electrodes (display pixel electrodes) for applying electric fields to liquid crystal layer 52 and thereby displaying images on display 14. Thin-film transistor circuitry 58A for forming the pixel circuits may be supported by transparent substrate layer 58B (e.g., a layer of glass, transparent plastic, etc.).

In this configuration, layer 56 may be a color filter layer that includes color filter element layer 56A on transparent substrate 56B (e.g., a clear glass or plastic layer, etc.) for providing display 14 with the ability to display color images. Color filter element layer 56A may include an array of color filter elements 56A' (e.g., color filter elements such as red, green, and blue filter elements formed from colored polymer or other colored materials). In active area AA, opaque masking material such as black masking material BM may have a grid shape (sometimes referred to as a black matrix) with openings for respective color filter elements 56A'. In inactive area IA, black masking material BM may form an opaque border for display 14 that helps hide internal components in device 10 from view by viewer 48. The black masking material BM in inactive area IA may have an opening such as opening 86 for window 26. Black masking material BM may be formed from a polymer containing dye, carbon black particles, or other opaque material (e.g., material BM may be black ink). Configurations in which opaque masking layers are formed from other opaque materials may also be used.

If desired, multiple layers of black masking material BM with openings such as opening 86 may be formed in layers 46 and/or black masking material BM may be formed on a different layer than layer 56B. For example, one or more layers of opaque masking material for forming an opaque border in inactive area IA may be formed within polarizer layer 54, between polarizer layer 54 and the upper surface of substrate 56B, within layer 58A, between layer 58A and layer 58B, and/or in polarizer layer 60 or between polarizer layer 60 and layer 58.

To help absorb stray light that is produced by backlight structures 42 and thereby prevent stray light from interfering with the operation of light-sensing device 32, stray light absorption layer 82 may be formed on the lower (inner) surface of layer 58 (e.g., the lower surface of clear glass or plastic substrate layer 58B). Stray light absorption layer 82 may have an opening such as opening 84 that is aligned with the opening(s) in the other opaque layer(s) in inactive area IA such as opening 86 in black masking layer BM in color filter element layer 56A, thereby forming window 26. Stray light absorption layer 82 may be formed from one or more layers of material that absorb light at the wavelengths of operation of light-sensing device 32 (e.g., visible, infrared, and/or ultraviolet wavelengths).

Stray light absorption layer 82 may have an index of refraction value that is matched to the index of refraction of layer 58B. This helps prevent stray light in layer 58B from propagating laterally (in the X and Y dimensions of FIG. 3) due to total internal reflection in layer 58B (i.e., the waveguiding behavior of layer 58B is defeated). The index of refraction of layer 58B may be 1.55 or other suitable value and the index of refraction of layer 82 may be within 2% (plus or minus) of 1.55, may be within 5% of 1.55, may be within 8% of 1.55, or may be within 10% or more of the index of refraction of layer 58B (as examples). When the index of refraction of the material(s) that make up layer 82 is sufficiently close to the index of refraction of layer 58B, stray light such as a stray portion of light 44 from backlight unit 42 that travels from active area AA to inactive area IA by waveguiding within layer 58B (by total internal reflection) is extracted into layer 82 (i.e., total internal reflection is defeated due to the presence of layer 82).

Once the stray light has been extracted from layer 58B and is within layer 82, light-absorbing material in layer 82 may absorb the light and prevent the light from reaching light-sensing device 32. The light-absorbing material in layer 82 may include dyes, pigments (e.g., particles of carbon black or other dark particles), semiconducting material such as semiconducting particles, metal (e.g., metal particles), inorganic light scattering and blocking material (e.g., inorganic particles of oxides, nitrides, etc.), or other suitable light-absorbing substances. Polymer binder (e.g., polymer adhesive material, thermoplastic resin, thermoset resin, or other polymer matrix material) may be used in hold particles and/or other materials in place within layer 82 and/or may be used in affixing one or more layers of light absorbing material to the lower surface of layer 58B.

Figure 4:
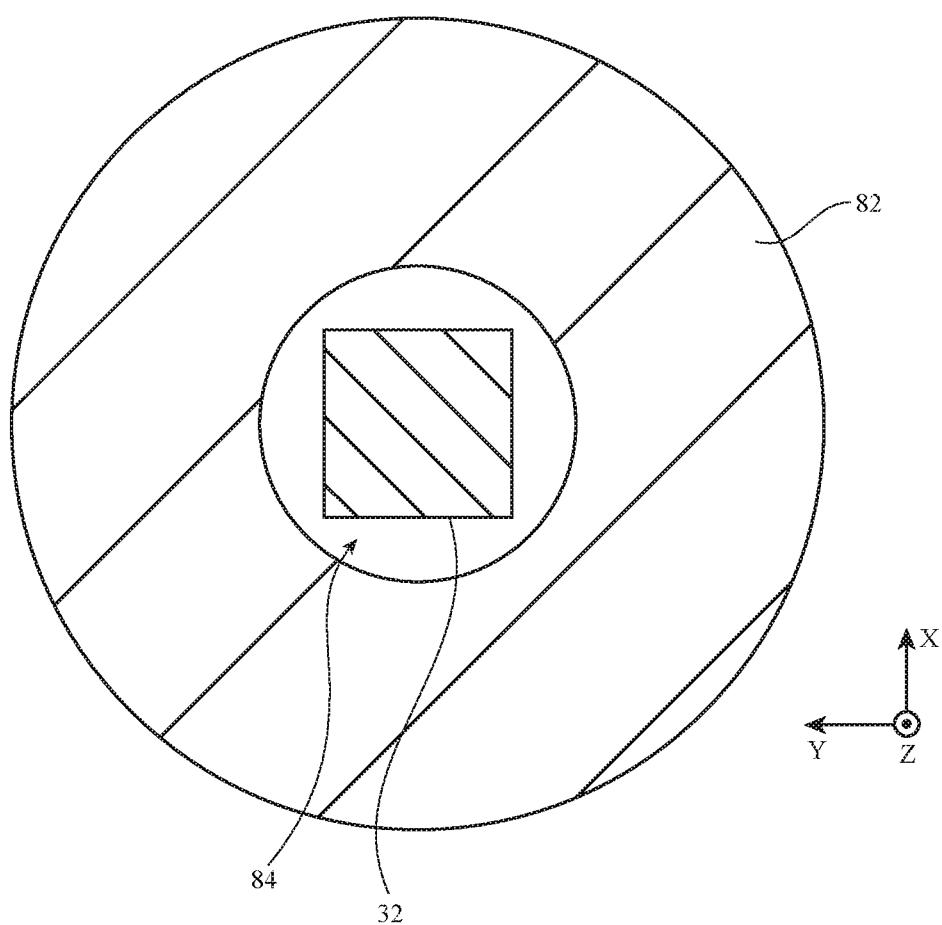
FIG. 4 is a top view of an illustrative stray light blocking structure surrounding a light sensing device in accordance with an embodiment.

Light absorbing layer 82 may have any suitable shape. As shown in the top view of illustrative layer 82 of FIG. 4, for example, layer 82 may have a circular outline with a central circular opening 84. Light-sensing device 32 may be aligned with opening 84 and may receive incoming ambient light 34 through opening 84. If desired, layer 82 may have a rectangular shape, may have one or more openings 84 of other shapes (rectangular, square, circular, oval, shapes with straight and curved edges, etc.), and/or may have shapes without openings (e.g., layer 82 may form a strip of material that is laterally interposed between device 32 and the adjacent edge of backlight 42. The illustrative shape of light absorbing layer 82 of FIG. 4 is merely illustrative.

Figure 5:
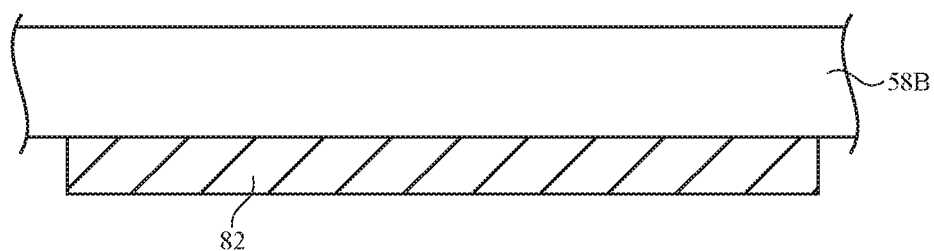
FIG. 5 is a cross-sectional side view of a stray light blocking layer formed from a single layer of material in accordance with an embodiment.
Figure 6:
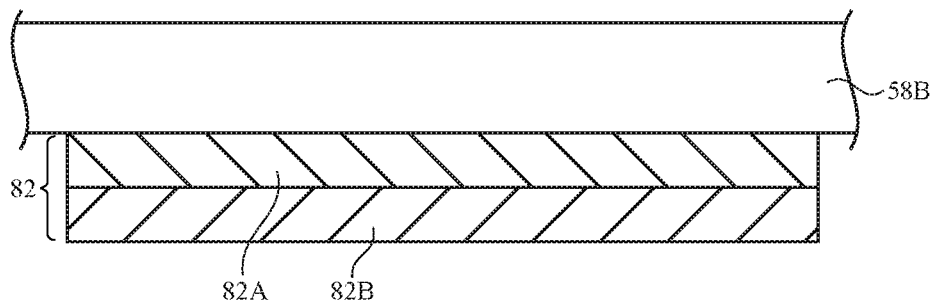
FIG. 6 is a cross-sectional side view of a stray light blocking layer formed from tape having a polymer carrier layer and an adhesive layer in accordance with an embodiment.

Layer 82 may be formed from a single layer of material (e.g., a polymer binder material or other material that includes embedded light-absorbing material such as particles of carbon black and/or other light-absorbing materials such as inorganic materials deposited as a coating) as shown in FIG. 5 or may have multiple layers such as layers 82A and 82B as shown in FIG. 6. In configurations of the type show in FIG. 5, printing techniques (e.g., printing and curing of a black ink or other opaque liquid material), physical vapor deposition techniques, or other material deposition techniques may be used to deposit a uniform layer of material 82 on the underside of layer 58B. In a configuration of the type shown in FIG. 6, layer 82 may be a tape layer and may have a flexible light-absorbing tape substrate layer that is attached to layer 58B using adhesive. For example, layer 82B may be formed from a polymer binder material or other material that includes embedded light-absorbing material such as particles of carbon black and/or other light-absorbing materials (e.g., layer 82B may be a flexible plastic light-absorbing film) and layer 82A may be a layer of pressure sensitive adhesive or other adhesive for attaching layer 82B to layer 58B. Layers 82A and/or 82B may include light-absorbing material. If desired, additional sublayers (e.g., three or more layers) may be used in forming layers such as layer 82 of FIG. 6. The arrangement of FIG. 6 in which layer 82 includes two layers is merely illustrative. In general, layer 82 may be formed using physical vapor deposition, chemical vapor deposition, electroplating, screen printing, inkjet printing, or pad printing (e.g. printing of black ink or other liquid opaque material), techniques involving attachment of a tape, or other suitable coating techniques.

Figure 7:
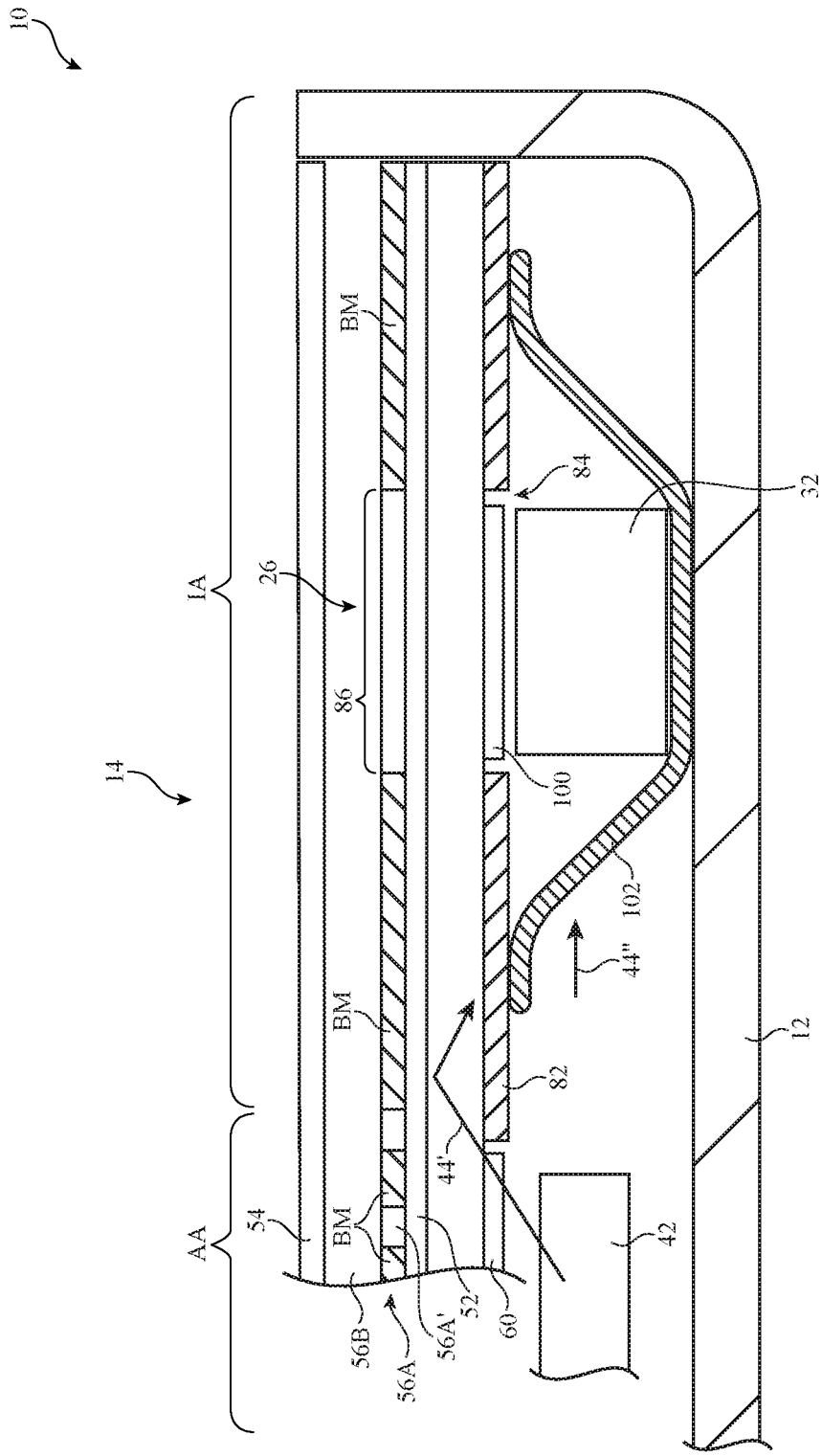
FIG. 7 is a cross-sectional side view of an illustrative edge portion of a laptop computer having a light sensing device mounted under an inactive portion of a display in accordance with an embodiment.

As shown in the cross-sectional side view of illustrative device 10 of FIG. 7, a light diffusing layer (e.g., a translucent polymer layer, or other layer with light refracting and/or light diffracting structures) such as diffusing layer 100 may be placed within opening 84 to help homogenize ambient light that is being received by light-sensing device 32 (e.g., to help reduce or eliminate angular sensitivity in light sensing measurements). If desired, diffusing layer 100 may be incorporated into device 32. Light blocking structures 102 (sometimes referred to as a light-shielding boot, light-shielding sleeve, or light shield) may be used to help block stray backlight (see, e.g., light 44"). Structures 102 may be formed from plastic (e.g. elastomeric plastic), metal, or other suitable materials. Stray backlight in layer 58B (see, e.g., light 44') may be extracted from layer 58B and absorbed by layer 82 to enhance the performance of light-sensing device 32.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
    a display having backlight structures that produce backlight illumination and having display layers, wherein the display layers have an active area with an array of pixels that are backlit using the backlight illumination and wherein the display layers have a pixel-free inactive area that includes an opaque masking layer with an opening that forms a window;
    a light-sensing device that receives light through the window; and
    a stray light absorption layer on a given one of the display layers, wherein the stray light absorption layer has an opening that is aligned with the opening in the opaque masking layer and absorbs stray portions of the backlight illumination.

2. The electronic device defined in claim 1 wherein the stray light absorption layer comprises a coating layer on the given display layer.

3. The electronic device defined in claim 2 wherein the display layers include a thin-film transistor layer having a glass substrate layer with opposing first and second surfaces, wherein the thin-film transistor layer has a layer of thin-film transistor circuitry on the first surface, and wherein the stray light absorption layer is a coating layer on the second surface.

4. The electronic device defined in claim 3 wherein the glass substrate layer has an index of refraction and wherein the stray light absorption layer has an index of refraction that is within 5% of the index of refraction of the glass substrate layer.

5. The electronic device defined in claim 1 wherein the stray light absorption layer comprises tape on the given display layer.

6. The electronic device defined in claim 5 wherein the display layers include a thin-film transistor layer having a glass substrate layer with opposing first and second surfaces, wherein the thin-film transistor layer has a layer of thin-film transistor circuitry on the first surface, and wherein the tape is attached to the second surface.

7. The electronic device defined in claim 6 wherein the glass substrate layer has an index of refraction and wherein at least some of the tape has an index of refraction that is within 5% of the index of refraction of the glass substrate layer.

8. The electronic device defined in claim 1 wherein the given one of the display layers comprises a first of a pair of first and second display layers and wherein the display includes a layer of liquid crystal material interposed between the first and second display layers.

9. The electronic device defined in claim 8 wherein the first of the display layers includes thin-film transistor circuitry.

10. The electronic device defined in claim 9 wherein the opaque masking layer is formed on the second display layer.

11. The electronic device defined in claim 10 wherein the second display layer includes a glass substrate layer and a color filter element layer on the glass substrate layer.

12. The electronic device defined in claim 11 wherein the color filter element layer includes an array of color filter elements and black masking material with openings for the color filter elements and wherein the opaque masking layer in the inactive area is formed from a portion of the black masking material.

13. The electronic device defined in claim 1 wherein the light-sensing device comprises an ambient light sensor.

14. The electronic device defined in claim 13 wherein the ambient light sensor comprises a color ambient light sensor.

15. The electronic device defined in claim 14 wherein the display layers include a thin-film transistor layer, wherein the stray light absorption layer is formed on the thin-film transistor layer, and wherein the opaque masking layer is formed on a display layer other than the thin-film transistor layer.

16. An electronic device, comprising:
a liquid crystal display having first and second layers and a layer of liquid crystal material interposed between the first and second layers, wherein the liquid crystal display has an active area that is backlit by backlight illumination, and wherein the liquid crystal display has an inactive area with an opaque masking layer that has an opening for a light transmitting window;
backlight structures that produce the backlight illumination;
an ambient light sensor aligned with the light transmitting window; and
a stray light absorption layer on the first layer that blocks stray portions of the backlight illumination.

17. The electronic device defined in claim 16 wherein the opaque masking layer is formed on the second layer.

18. The electronic device defined in claim 17 further comprising a layer of thin-film transistor circuitry on the first layer.

19. The electronic device defined in claim 18 further comprising a color filter element layer on the second layer.

20. The electronic device defined in claim 16 wherein the first layer has a glass substrate layer having an index of refraction and wherein the stray light blocking layer comprises an opaque material with an index of refraction that is within 5% of the index of refraction of the glass substrate layer.

21. The electronic device defined in claim 20 wherein the stray light blocking layer comprises tape.

22. A portable computer, comprising:
a first housing;
a second housing that is coupled to the second housing and that rotates relative to the first housing;
a display in the first housing, wherein the display includes backlight structures that produce backlight illumination and includes liquid crystal display layers including first and second display layers and a layer of liquid crystal material interposed between the first and second display layers, wherein the liquid crystal display layers form an active area with pixels that is backlit by the backlight illumination and form an inactive area with an opaque masking layer, wherein the opaque masking layer has an opening for a light transmitting window;
an ambient light sensor aligned with the light transmitting window; and
a stray light absorption layer on the first display layer that blocks stray portions of the backlight illumination and that has an opening aligned with the ambient light sensor.

23. The portable computer defined in claim 22 wherein the stray light absorption layer comprises a layer of glass, wherein the stray light absorption layer is formed on the layer of glass, and wherein the opaque masking layer is formed on the second display layer.

* * * * *